United States Patent [19]
Piech et al.

[11] 3,849,006
[45] Nov. 19, 1974

[54] METHOD FOR EXTRACTING PHOTOMETRIC INFORMATION FROM AERIAL PHOTOGRAPHIC IMAGERY

[75] Inventors: Kenneth Robert Piech, Williamsville; John Elwyn Walker, Buffalo, both of N.Y.

[73] Assignee: Calspan Corporation, Buffalo, N.Y.

[22] Filed: June 4, 1973

[21] Appl. No.: 366,913

[52] U.S. Cl. .................. 356/209, 356/173, 356/202
[51] Int. Cl. .......................................... G01n 21/48
[58] Field of Search ........... 356/209, 204, 202, 173, 356/213

[56] References Cited
OTHER PUBLICATIONS

Rib et al., "Automatic Interpretation of Terrain Features," Photogrammetric Engineering; V. 35, No. 2, 1967, pp. 153–164.

Primary Examiner—John K. Corbin
Assistant Examiner—Conrad Clark
Attorney, Agent, or Firm—Allen J. Jaffe

[57] ABSTRACT

A method for extracting terrain reflectance data from an aerial photographic image so that the scene can be processed on the basis of such photometric properties.

4 Claims, 4 Drawing Figures

3,849,006

METHOD FOR EXTRACTING PHOTOMETRIC INFORMATION FROM AERIAL PHOTOGRAPHIC IMAGERY

Although a considerable amount of scene information can be extracted from an aerial photograph by conventional visual interpretation, a significant amount of information in the photograph remains unresolved. To supplement such standard analyses and to extract further information, the photointerpreter must develop means for accurately measuring, enhancing and interpreting the photometric properties of terrian elements. Image calibration becomes important because it establishes the standards by which the reflectance and reflectance ratio between two spectral bands is used in the discrimination process for extracting further information.

In accordance with the teachings of the present invention, the interpreter accomplishes the calibration procedure by successively placing a number of different shadows within the densitometer probe of his stereoscope viewer. A console calculator automatically takes the density readout, converts densities to exposures corrected for falloff, and calculates the film calibration parameters. Thus, the interpreter can automatically and easily remove the effects of altitude, atmospheric conditions and photographic system variables from his image. The reasoning behind this calibration is described below.

Calibration is accomplished very simply by a shadow calibration procedure. The first step in any calibration procedure or photometric analysis is to reduce the measured film densities to relative exposures by use of the film D-log E curve, and then to remove camera falloff effects from the measured exposures. Analyses then proceed from these exposure values.

The resultant exposures, however, must still be processed to obtain terrain reflectance values. Such processing is non-trivial, as exposure is dependent upon meteorological conditions, atmospheric transmittance, altitude of measurement, and illumination conditions, (such as proportion of sunlight to skylight, and degree of "airlight" - the contribution to exposure by illumination scattered to the camera by the air column beneath the camera). The effects on exposure of all of these variables can be expressed by three parameters for any given spectral band. Any exposure can be shown to be a function of terrain reflectance and the parameters $\alpha$, $\alpha'$, and $\beta$ where the parameter $\alpha$ is proportional to atmospheric transmittance and total (sunlight + skylight) irradiance; $\alpha'$ is proportional to atmospheric transmittance and skylight irradiance; $\beta$ is proportional to the amount of air light in the scene, and the the amount of camera flare light.

Operational measures of terrain reflectance thus require knowledge of $\alpha$, $\alpha'$, and $\beta$. These parameters can be determined in a straightforward manner.

It is an object of this invention to provide a technique for determining the parameters for determining the reflectance of any object in a scene.

It is a further object of this invention to provide a technique for determining the parameters for removing skylight surface reflection from water bodies.

It is an additional object of this invention to provide a technique for determining the parameters for determining volume reflectance of water bodies. These objects, and others as will become apparent hereinafter, are accomplished by the present invention.

Basically the present invention provides a method for extracting photometric data which comprises choosing at least two shadows over different reflectances in the input photographic scene, determining the shadow and non-shadow radiances for each shadow chosen, calculating $\beta$ and $\alpha/\alpha'$, choosing a standard object in non-shadow in the input photographic scene, determining the radiance of the standard object, calculating $\alpha$ and $\alpha'$.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 1:
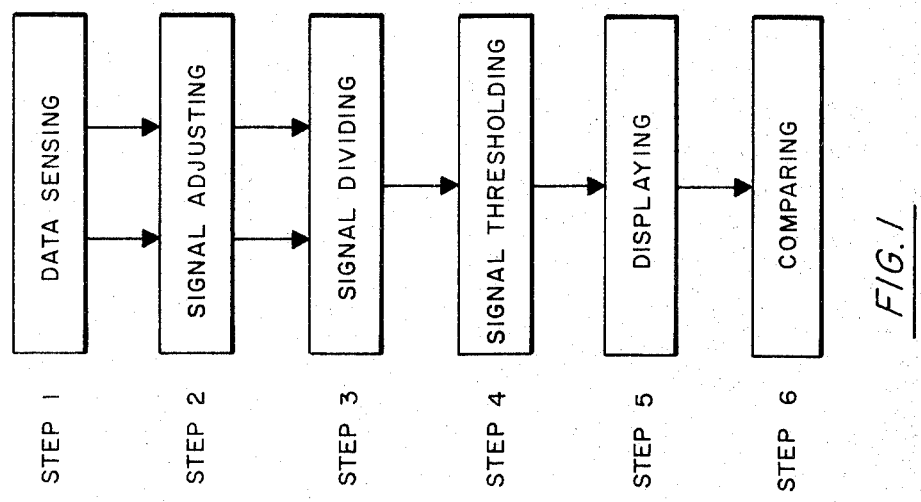
FIG. 1 is a flow diagram illustrative of successive steps in a method of data interpretation.

The flow diagram of FIG. 1 illustrates the successive steps in a process for the interpretation of remotely sensed data, the details of which are set forth in co-pending U.S. Pat. application Ser. No. 351,414 filed Apr. 16, 1973 and assigned to a common assignee. The first step is data sensing in which a remote sensor senses data in a plurality of wave bands in the range of $\lambda_o-\lambda_-$. The second step is signal adjusting in which data supplied by the remote sensor in a pair of bands in the range of $\lambda_o-\lambda_-$ is corrected so as to compensate for sensor non-linearity. The third step is signal dividing in which the two corrected signals are mathematically divided. The fourth step is signal thresholding in which the signal representing the quotient of the division is converted from an analog to a digital signal. The fifth step is displaying in which the divided signals, at the threshold range or level, are displayed. The sixth step is comparing the displayed and the original data and interpreting the differences.

Within each spectral band three parameters ($\alpha$, $\alpha'$, $\beta$) are necessary to calibrate an image photometrically, and these parameters can be obtained by critical analysis of scene shadow areas. It is assumed the photointerpreter has reduced photographic densities to exposure values; i.e., accurate density measurements have been obtained through a densitometer, and density values have been reduced to exposures through D-log E curve.

The exposure E due to a terrain object can be written to good approximation as:

$$E = \alpha R + \beta \quad (1)$$

Here $\alpha$ is a parameter proportional to atmospheric transmittance and total (sunlight and skylight) irradiance; $\beta$ is proportional to amount of air light-light scattered into the camera which has been scattered within the atmosphere; and R is object reflectance dependent on the angular characteristics of the illumination, and hence $\alpha/\alpha'$.

The phenomena giving rise to $\alpha, \alpha', \beta$ and calibration technique motivation will be discussed for reflectance interpretation of bodies of water. Similar considerations, of course, hold for other terrain elements. In the case of a body of water, Equation 1 may be specialized to $$E = \alpha R_v + (\alpha'/\pi) R_s + \beta \quad (2)$$

where $\alpha'$ is proportional to atmospheric transmittance and skylight irradiance; $R_v$ is volume spectral reflectance (VSR) of the body; and $R_s$ is surface reflectance of the air-water interface as seen from the air.

Figure 2:
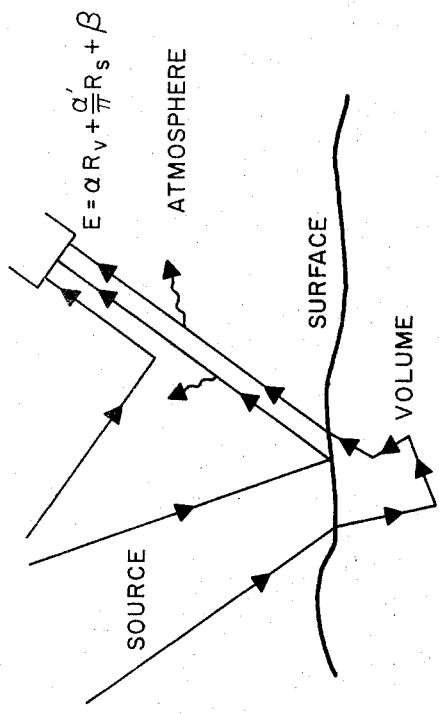
FIG. 2 is a schematic diagram of the phenomena giving rise to apparent reflectance of a body of water.

Motivation for Equation 2 can now be described as follows. The apparent reflectance of a body of water is strongly affected by four phenomena (FIG. 2): source effects; atmospheric effects; surface effects; and volume effects. Of these phenomena, only volume effects are normally sensitive to water quality parameters. (We exclude here consideration of surface phenomena such as oil slicks which form a separate class of problems.) Effects of source, atmosphere and surface distort the information of interest, and must be removed from the measurement process to obtain an accurate estimate of VSR.

As reflectance is essentially proportional to the ratio of reflected energy to incident energy, knowledge of source strength for the various spectral regions at the time of measurement is crucial. Additional source effects derive principally from relative distribution of sunlight to skylight. The spectral character of sunlight differs from skylight as does the angular character of the irradiation. Changes in atmospheric conditions result in variation in sunlight-skylight distribution and yield apparent reflectance changes due to the consequent transformation of the spectral character of the incident radiation.

In addition, specular surface reflections of skylight exist at every image point of the body of water. The proportion of skylight in the incident irradiance thus determines the magnitude of this surface reflected energy. As this surface reflected skylight contains no water quality information, it must be removed from the data if it is significant compared to the volume reflected energy.

At any image point the ratio of volume reflected energy $E_v$ to energy of surface reflected skylight $E_s$ is:

$$E_v/E_s \sim (1 + f) \quad (3)$$

where $f$ is a parameter equal to the ratio of sunlight irradiance to skylight irradiance. For a very clear day $f$ is about 7; for a day with thin clouds $f$ is approximately 1. Thus even for a clear day of the order of 10 percent of image energy is surface reflected skylight. For a cloudy day, this proportion can rise to the order of 50 percent. Variations of this order can easily mask reflectance effects due to actual water quality characteristics. Meteorological changes from day to day or location to location can cause fluctuations in degree of skylight (and hence $E_s$) which are potentially interpretable as water quality variations. A reasonable degree of care must be taken to remove these effects.

In the instance of terrain elements other than water, it is still important to establish the proportion of skylight present. This is because the reflectance of soil and vegetation depends on the angle of illumination. Reflectance interpretation thus entails consideration of solar zenith angle and proportion of diffuse illumination $f$.

Within the atmosphere, reflected radiance is further modified by attenuation due to atmospheric scattering and absorption, and by the addition of air light (light scattered into the camera which has been scattered within the atmosphere). These effects depend strongly on weather conditions and on altitude of measurement.

Taking into account all of these effects, illumination at the camera can be described as in Equation 2. Water quality evaluations can be attempted if exposure values can be reduced to reflectance values $R_v$. Variation of $R_v$ with wavelength can yield turbidity and hence water quality information. As $R_s$ is a well-known function of angle, $R_v$ can be determined from E provided $\alpha, \alpha'$ and $\beta$ are known. (There is a problem here for observation angles $\gtrsim 40°$ from the vertical, as wave conditions can then make $R_s$ vary by increasing reflection angles to values $\gtrsim 40°$. Useful observation angles for accurate $R_v$ determination are thus restricted to angles $\lesssim 30°$.)

The technique determines $\alpha, \alpha'$ and $\beta$ from a naturally occurring object of known reflectance and a characteristic shadow area. No preplaced control panels are necessary. Effects of variations in $\alpha, \alpha'$ and $\beta$ from one survey position to another are, as a result, eliminated or reduced by allowing determination of $\alpha, \alpha'$ and $\beta$ close to, or in, the photographic frame of interest.

Figure 3:
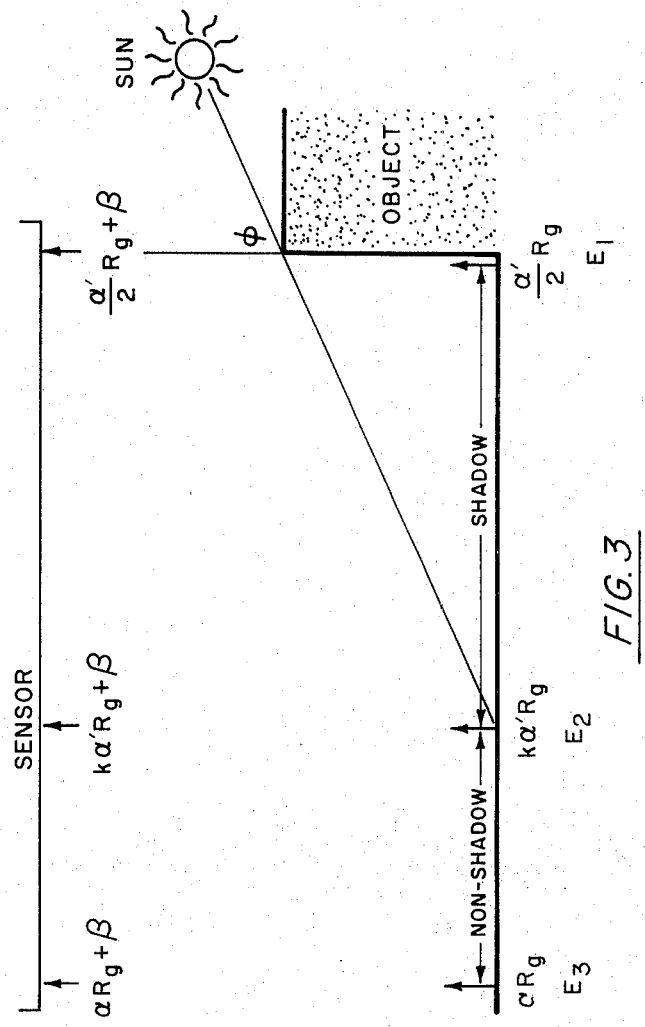
FIG. 3 is a schematic diagram of the geometry of shadow calculation.

The natural object and shadow area contain sufficient information to determine the three parameters. FIG. 3 contains a shadow schematic from which to determine $\beta$ and $\alpha/\alpha'$. The term k is a proportionality constant dependent on object width. It is approximately $$1 - (\Psi/2\pi) \cos \phi$$

where $\Psi$ is the angle subtended by object width at the outer edge of the shadow in radians, and $\phi$ is the solar zenith angle. FIG. 3 yields the following equations:

$$E_1 = (1/2)\alpha' R_g + \beta$$
$$E_2 = k\alpha' R_g + \beta$$
$$E_3 = \alpha R_g + \beta$$
$$(4)$$

where $R_g$ is the local ground reflectance. Solving two of these equations for $R_g$:

$$\alpha/k\alpha' = (E_3-\beta/E_2-\beta) \quad (5)$$

Taking a second shadow over terrain with a different reflectance yields the following equations:

$$E_1^* = (1/2)\alpha' R_g^* + \beta$$
$$E_2^* = k^*\alpha' R_g^* = \beta$$
$$E_3^* = \alpha R_g^* = \beta$$
$$(6)$$

Solving two of these equations for $R_g^*$:

$$\alpha/k^*\alpha' = E_3^* = \beta/E_2^* - \beta \tag{7}$$

Since $\alpha/\alpha'$ is a constant for a small area of the frame or for the entire frame under uniform weather conditions, and since $k \approx k^*$ for most usable shadows (especially for small scale imagery), $$E_3 - \beta/E_2 - \beta = E_3^* - \beta/E_2^* - \beta \tag{8}$$

and therefore $\beta$ is known and once $\beta$ is known, $\alpha/\alpha'$ is known. The parameters $k$ and $k^*$ are easily determined from metric measurements on the imagery.

In practice, a more accurate determination of $\beta$ and $\alpha/\alpha'$ can be obtained by considering a set of shadows and performing a least squares fit to these data. In this case it is more convenient to write the last two of equations 4 as:

$$E_2 = k\alpha' R_g + \beta$$
$$E_3 = (\gamma + k\alpha') R_g + \beta \tag{9}$$

where $\alpha = \gamma + k\alpha'$, and $\gamma$ is proportional to solar irradiance. (Note as one moves away from the shadowing object $k \to 1$ and $\alpha \to \gamma + \alpha'$) These equations can be rewritten into the form:

$$E_3 = [1 + (\gamma/k\alpha')]E_2 - \beta(\gamma/k\alpha') \tag{10}$$

This equation is a linear relationship between $E_3$ and $E_2$, the exposures just inside and just outside a shadow (see FIG. 3). The slope of this line is $[1 + (\gamma/k\alpha')]$, and the intercept is $[-\beta(\gamma/k\alpha')]$. As before, two shadows are sufficient to determine the slope and intercept, and hence, $\beta$ and $\gamma/\alpha'$ (equivalently $\alpha/\alpha'$). In practice a number of shadows can be analyzed, and a least squares fit is made to these data in the form of equation 10 in order to obtain more accurate values for $\beta$ and $\gamma/\alpha'$.

A standard object, typically an asphalt scene element such as a roof or roadway in sunlight, is used to establish the value of $\alpha$ through $$E_4 = \alpha R_o + \beta \tag{11}$$

where $R_o$ is the known or estimated reflectance of the object. Once $\alpha$ has been determined through equation 11, $\alpha'$ is determined.

Figure 4:
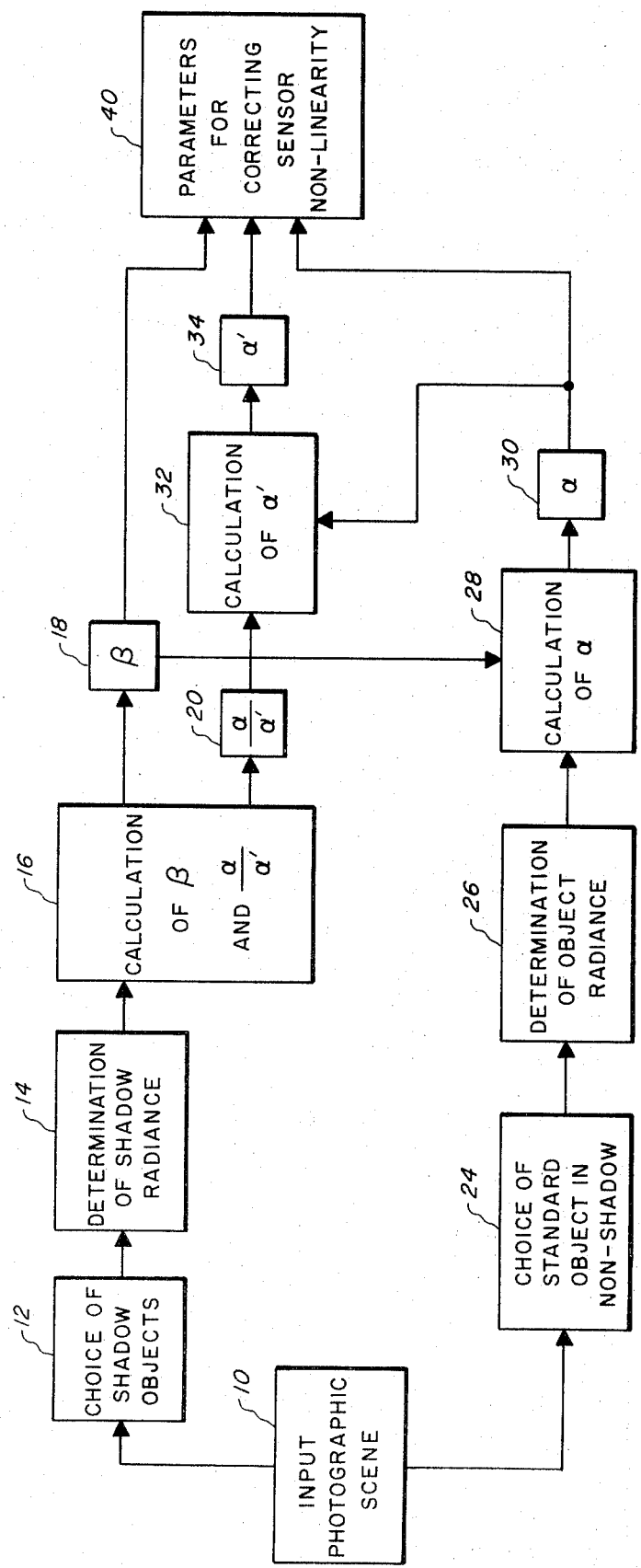
FIG. 4 is a flow diagram of step 2 of FIG. 1.

The flow diagram of the steps in the calculations described above is shown in FIG. 4. The output of the data sensing, step 1 of FIG. 1, is a photographic scene, labeled 10 in FIG. 4. The photointerpreter selects at least two shadows with different reflectances, labeled 12, and for each of these shadows selects two points on the edges of the shadow and a third point outside the shadow, labeled 14, and then determines the shadow and nonshadow radiances by measurement of the photographic density and the use of film D-log E curve to obtain equations 4 and 6. The solving of equations 4 and 6, labeled 16, yields $\beta$ and $\alpha/\alpha'$, labeled 18 and 20, respectively. The photointerpreter selects a standard object of known reflectance in nonshadow, labeled 24, and determines the object radiance, labeled 26, by measurement of the photographic density and the use of film D-log E curve to obtain equation 11. The calculation of $\alpha$, labeled 28, is then possible by inserting the value of $\beta$ into equation 11 to yield $\alpha$, labeled 30. The calculation of $\alpha'$, labeled 32, is then possible since $\alpha$ and $\alpha/\alpha'$ are known and substituting yields $\alpha'$, labeled 34. With the values of $\alpha$, $\alpha'$ and $\beta$ thus determined, it is possible to correct for sensor non-linearity, labeled 40.

Although the preferred embodiment of the present invention has been illustrated and described, other changes will occur to those skilled in the art. It is therefore intended that the scope of the present invention is to be limited only by the scope of the appended claims.

We claim:

1. A method for extracting photometric information from aerial photographic imagery including the steps of:

choosing at least two shadows over different reflectances in the input photographic scene;

determining the shadow and non-shadow radiances for each shadow chosen;

calculating $\beta$ and $\alpha/\alpha'$, where $\alpha$ is proportional to atmospheric transmittance and total (sunlight + skylight) irradiance; $\alpha'$ is proportional to atmospheric transmittance and skylight irradiance; where $\beta$ is proportional to the amount of air light in the scene, and to the amount of camera flare light;

choosing a standard object in non-shadow in the input photographic scene;

determining the radiance of the standard object;

calculating $\alpha$ and $\alpha'$, whereby the parameters for calibrating an image photometrically and for correcting for sensor non-linearity are obtained.

2. The method of claim 1 wherein the step of determining the shadow and non-shadow radiances for each shadow chosen includes selecting a point outside each chosen shadow and at least one point on the edge of each chosen shadow.

3. The method of claim 1 wherein the step of determining the shadow and non-shadow radiances for each shadow chosen includes the measurement of the photographic density.

4. The method of claim 1 wherein the step of determining the radiance of the standard object includes the measurement of the photographic density.

* * * * *

UNITED STATES PATENT OFFICE
CERTIFICATE OF CORRECTION

Patent No. 3,849,006          Dated November 19, 1974

Inventor(s) Kenneth Robert Piech and John Elwyn Walker

It is certified that error appears in the above-identified patent and that said Letters Patent are hereby corrected as shown below:

Column 1, line 12, "terrian" should read --terrain--. Column 2, lines 34 and 37, "$\lambda_-$" should read --$\lambda_\infty$--. Column 4, lines 63 and 64, that portion of the equations reading "$=\beta$" should read --$+\beta$--. Column 5, line 1, that portion of the equation reading "$E_3^* = \beta/E_2^* - \beta$" should read --$E_3^* - \beta/E_2^* - \beta$--; lines 24, 26 (twice), 28, 31 (twice), 36, 37, 39 and 43 "$\gamma$" should read --$\delta$--.

Signed and sealed this 1st day of April 1975.

(SEAL)
Attest:

RUTH C. MASON
Attesting Officer

C. MARSHALL DANN
Commissioner of Patents
and Trademarks